Nov. 19, 1968     T. PIOTROWSKI     3,412,186
METHOD FOR THE MANUFACTURE OF HOLLOW ARTICLES
OF THERMOPLASTIC MATERIAL

Filed May 27, 1966     4 Sheets-Sheet 1

INVENTOR.
TADEUSZ PIOTROWSKI
BY
Dicke + Craig
ATTORNEYS

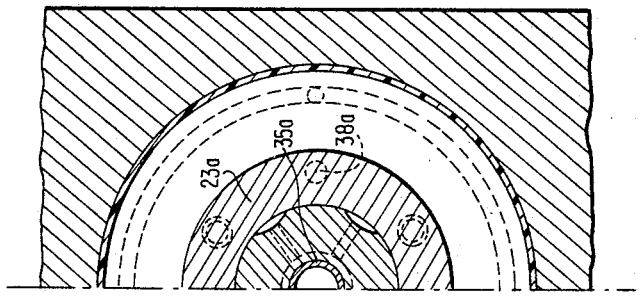
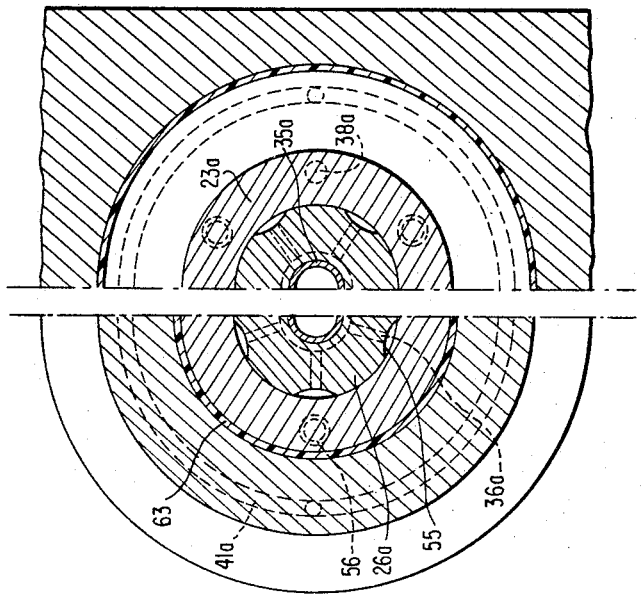
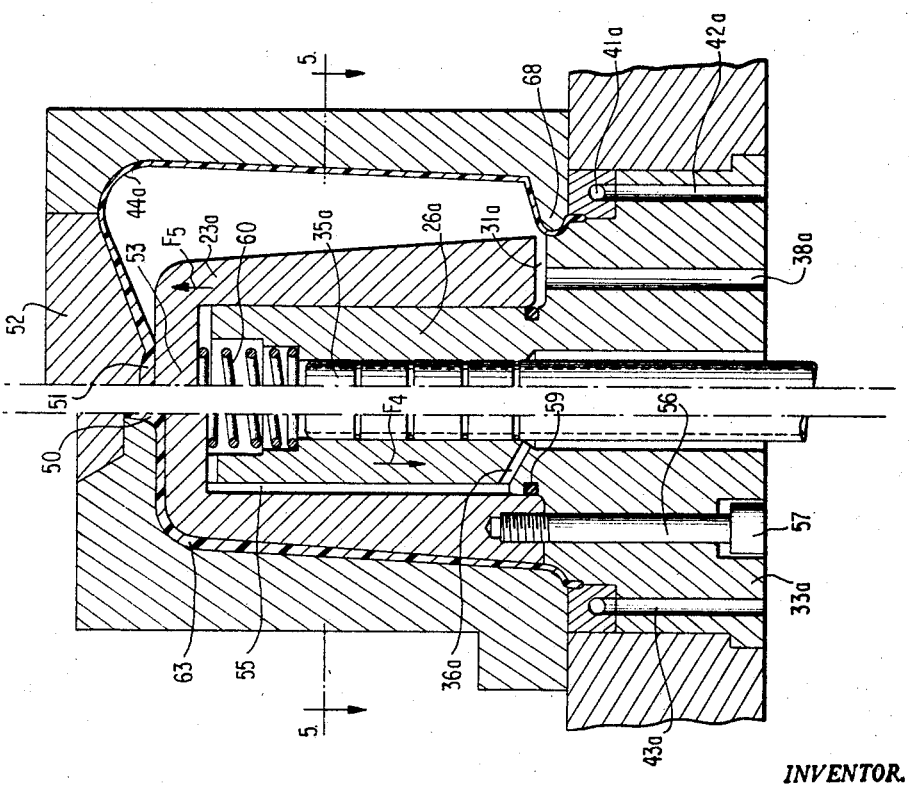

Nov. 19, 1968 T. PIOTROWSKI 3,412,186
METHOD FOR THE MANUFACTURE OF HOLLOW ARTICLES
OF THERMOPLASTIC MATERIAL
Filed May 27, 1966 4 Sheets-Sheet 3

INVENTOR.
TADEUSZ PIOTROWSKI
BY
Dickey + Craig
ATTORNEYS

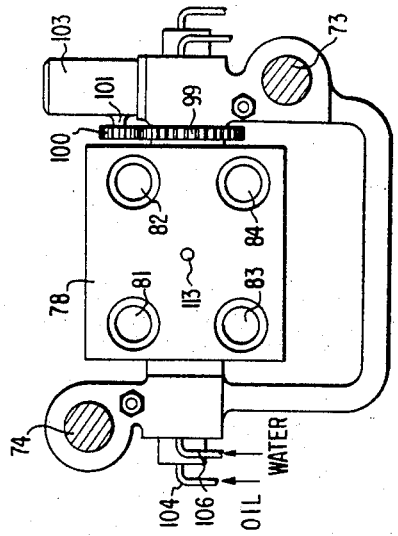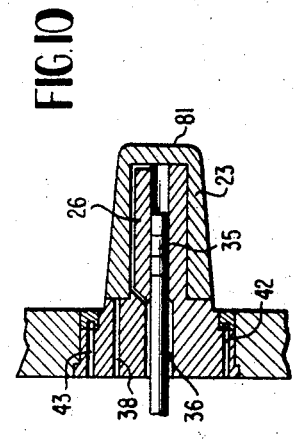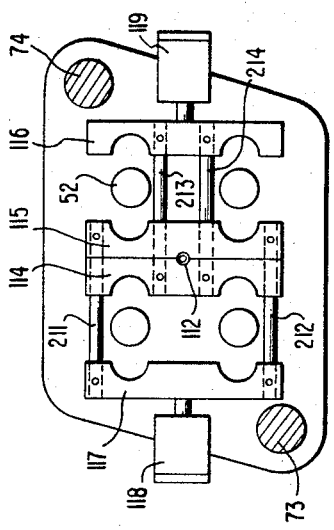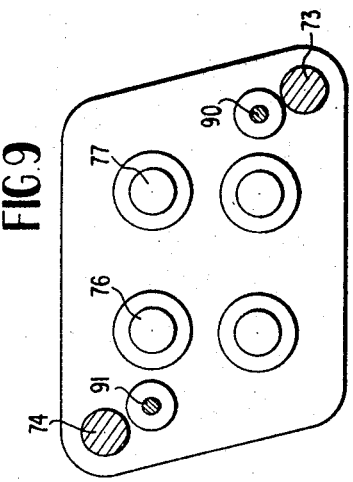

United States Patent Office 3,412,186
Patented Nov. 19, 1968

3,412,186
METHOD FOR THE MANUFACTURE OF HOLLOW ARTICLES OF THERMOPLASTIC MATERIAL
Tadeusz Piotrowski, Montreuil-sous-Bois, France, assignor to Worson S.A., Geneva, Switzerland, a corporation of Switzerland
Continuation-in-part of application Ser. No. 225,604, Sept. 24, 1962, which is a continuation-in-part of application Ser. No. 765,662, Oct. 6, 1958. This application May 27, 1966, Ser. No. 553,486
Claims priority, application France, Oct. 12, 1957, 749,319; July 1, 1958, 769,190
12 Claims. (Cl. 264—89)

The present application is a continuation-in-part of copending application Ser. No. 225,604, filed Sept. 24, 1962, which is a continuation-in-part of application Ser. No. 765,662, filed Oct. 6, 1958, both abandoned.

The present invention relates to improvements in a method for manufacturing hollow articles of thermoplastic material from injected blanks or preforms which are inflated or blown so as to take the shape of the desired articles.

It is known in the prior art to effect such a process by pressing the edge of a substantially molten or pasty preform onto the neck of a hollow mold which has the shape of the desired articles. The preform is then blown or inflated within this mold, starting from the edge thereof, until it completely touches against the walls of the mold and, on contact with these walls, the distended preform cools instantaneously, thereby permanently assuming the shape of the mold, i.e., the desired article.

For obvious reasons of production speed and in order to prevent the pasty preform from being left to its own weight between the injection and blowing phases of the process, the blowing head is generally incorporated in the core upon which the preform or parison is injected. The core containing this blowing head is then conveyed to the entrance to the blowing mold.

For this latter reason, the compressed air channel for blowing, runs through the core and terminates at the surface thereof by means of an outwardly opening classic flap-valve. This valve may rise and allow the blowing air to escape. However, it also counters the penetration of plastic from the exterior into the air channel, particularly performing this function during injection.

However, in these presses, which are now well known and currently on the market, it is nevertheless impossible to manufacture, on a large scale, blown objects the walls of which are simultaneously:

Relatively thin, i.e., in particular, having a thickness of a few tenths of a millimeter. This is very important with regard to the cost of the article which, on a mass production scale, is directly connected with the amount of raw material used;

Of uniform thickness. With small thicknesses, all of the zones of weakness in the article considerably affect the behavior thereof in subsequent mechanical operations, for example, capsuling when the blown object is a receptacle. In addition, too great a thinness in a particular area may lead to punctures in the preform;

Uniformly distended. The stretching of certain thermoplastic materials, such as polystyrene, leads to the orientation of the molecules thereof, thus producing exceptional mechanical characteristics therein. In this way, if a fraction of the preform is transported but not distended during the blowing operation, a weak zone will be created in the blown object;

Free from swelling or pleats. If swelling is localized initially in certain regions of the preform which are softer and exposed to the jet of blowing air to a great extent, extensions of the material are produced which result in swellings and pleats in the wall of the blown layer which fold back upon themselves upon reaching the wall of the mold.

It is clear that any proportion, even very small, of defective articles is a detriment to the manufacture thereof on a mass production scale. For example, even a minute percentage of yogurt or milk containers bursting during capsuling, thereby soiling, splashing or covering the capsuling machines with the product being processed, would be a tremendous disadvantage and hindrance to the effective production thereof.

However, the processes and apparatus used in the prior art for making such articles create certain weaknesses therein which are barely discernible. This problem is of particular importance since it is essential in the course of such productions to blow uniformly a film of extreme fineness and thinness which, therefore, is very fragile, thereby making very unstable and uncertain the course of expansion thereof during blowing.

The manufacture of such blown articles therefore requires an absolute uniformity in the temperature of the preform at the time of blowing and in the mechanical expansion operation. These exigencies are practically impossible to achieve in injection or blowing presses whose cores are fitted with the classical flap-valves, since the blowing air channel, the flap-valve, and the stem and return spring thereof occupy a large space in the axis of the core. The result is that irrigation by a heat exchange fluid through the remainder of the core leads to such structural difficulties and such narrow assembly and tolerance limits in the construction of the core and, finally, to an apparatus so fragile and hazardous in use that, for practical reasons, it has never been possible to combine a blowing valve and heat control by fluid irrigation in the same core with complete success. Yet, such irrigation by fluid is imperative when it is necessary to cool periodically and promptly to about 80°–180° C. a core on which the preform is injected at a temperature of between approximately 180° and 240° C. In particular, certain polystyrenes injected at between 200° and 220° C., must be cooled to about 120° C. in order to obtain an effective blowing thereof.

Moreover, serious difficulties arise when it is desired to blow materials having a low specific heat such as polystyrene, rather than the classical materials of large thickness, such as polyethylene. This is particularly true when it is desired to blow such materials having a thickness of a few tenths of a millimeter, which is particularly the case when the core has a shape and dimensions approaching those of the finished article so that the regularity of the preform at the wall of the finished article may be retained. Thus, during conveyance of the preform from the injection chamber to the blowing mold, the pasty thermoplastic film cools in a non-uniform manner under the influence of the ambient air and the core. For example, the temperature of the core carrying the preform is higher in the region that is situated opposite the injection orifices and which is subjected to the material coming out in hot form from the injection nozzle. The result is that the temperature of the surface of the core which governs that of the film to be blown must be promptly regulated so as to be uniform throughout. However, local irregularities and dissymmetry of temperatures of a few degrees are enough to cause ruptures, swelling and/or folds which are irreconcilable with mass production operations.

The same drawbacks are encountered when, instead of using a thermoplastic material having a low specific heat, a material with a high specific heat is treated, such as polyethylene, and especially when a patsy layer of the preform is of small thickness.

The use of the classical flap-valves in the apparatus of the prior art also does not allow for regular, uniform, progressive and yet instantaneous expulsion of the blowing air. This is because the expulsion is too concentrated locally when the valve is at the top of the core, whereby the diameter of the passage section is reduced. In this case, the flow of air does not permit a gradual raising of the preform toward the walls of the mold and, thus, does not permit the plastic film to be laid gradually upon these walls.

When, on the contrary, the passage section of the valve is brought toward the base of the core and the fluid circulation is provided inside the latter, a valve is used whose flap, which is formed by the entire core, has an inertia which cannot be neglected. In addition, this flap is drawn toward its closed position by the return spring and the connections of the hydraulic cooling system. It is therefore necessary to put into operation appreciable blowing pressures in order to overcome the return force and inertia, which pressures are a disadvantage in achieving the necessary uniform and turbulent-free expansion.

In addition, the latter-mentioned apparatus of the prior art have relatively compact designs for the air expulsion means and for the entrance and exit of heat-regulating fluids. These factors, together with the relative distention of the various elements of the core, render the guidance of the flap particularly precarious and delicate and, consequently, render the positioning of the core particularly difficult. The result is that the core is sometimes moved laterally under the pressure of the plastic during injection, causing an irregular distribution of the preform on the core to be produced.

It has also been proposed in the prior art to replace the mobile flap-valves which rise under the pressure of the blowing gas with permanent orifices which are small enough to prevent penetration by the injected plastic material into the blowing air channel while allowing the air to escape at the same time. However, it has not been possible to achieve this proposal in practice since the only types of orifices which have been produced are in the form of pores and, in particular, in cores of porous cast iron. Injected plastic infiltrates and becomes implanted in these pores during the injection step, so that during blowing the preform adheres to the core at numerous points on its surface, whereby expansion thereof cannot take place correctly. In addition, porous cast iron, by its very nature, cannot be used with an internal irrigation system which, as stated above, is absolutely necessary in order to obtain an instantaneous heat regulation.

Thus, cores for blowing thin preforms having a heat regulation by means of fluid circulation as well as open or classical valve-type orifices have not produced satisfactory results on a practical level.

Therefore, one of the objects of the present invention is to provide a process which is carried out within an injection blowing machine and which involves a uniform heat control of the thermoplastic blank by a generalized and homogeneous irrigation of the surface of the core, and the uniform temperature of the core and the blank being maintained during transfer of the same from the injection to the blow mold. Moreover, the blowing orifice arrangement of the present invention does not affect this type of heat control.

The blowing orifice arrangement in accordance with the present invention has also proved to be particularly effective in blowing pre-injected, cooled and stored preforms which are subsequently reheated on a core before being blown therefrom. It is, in fact, very difficult to reheat such cold preforms by placing them in close contact onto a heated core because the pre-injected preforms which are produced at high speed become distorted during cooling and because it is practically impossible to place them correctly without local deformation or sagging on a very hot core. Thus, articles obtained by the blowing of such preforms are usually not satisfactory.

Thus, another object of the present invention is to provide a blowing orifice arrangement which may be employed in the blowing of previously stored preforms.

In addition, it has been observed that the bringing of injected or applied preforms quickly and at an absolutely even temperature onto a core subjects the semi-fluid preform to superficial or thermal internal tension forces which result in a leakage toward the base of the core of the material which is at the point or top of the core. This phenomenon is particularly noticeable where materials are used which do not adhere well to the core, such as polystyrenes having an appreciable content of rubber, for example, copolymerized with butadiene, or when the injected material is not yet sufficiently softened. In such a case, the very thin, pasty material coating the core and held by its base tends to contract. When this contraction is not very rapid, the central part of the base of the article may diminish to a very thin veil or it may even burst.

Therefore, another object of the present invention is to provide means for preventing such weaknesses and ruptures in blown articles.

Still another object of the present invention is to reduce the transfer between the injection and blowing means to a series of very brief movements and to render the size of these means as a whole and of the core small enough so that the entire means may be mounted on classical column-type injection presses.

Other objects and advantages of the present invention will become apparent to those skilled in the art from a consideration of the following specification and claims and of the attached drawings wherein:

FIGURES 4A and 4B show a longitudinal cross-section of the structure of the core in accordance with the present invention, FIGURE 4A showing said core within an injection chamber and FIGURE 4B showing said core within a blowing mold;

FIGURES 5A and 5B are transverse sections taken along the line 5—5 of FIGURES 4A and 4B, respectively;

FIGURE 7 is a transverse section taken along the line 7—7 of FIGURE 6;

FIGURE 8 is a transverse section taken along the line 8—8 of FIGURE 6;

FIGURE 9 is a transverse section taken along the line 9—9 of FIGURE 6; and

FIGURE 10 is an enlarged view of a core in accordance with the present invention within the apparatus of FIGURE 6.

Figure 1:
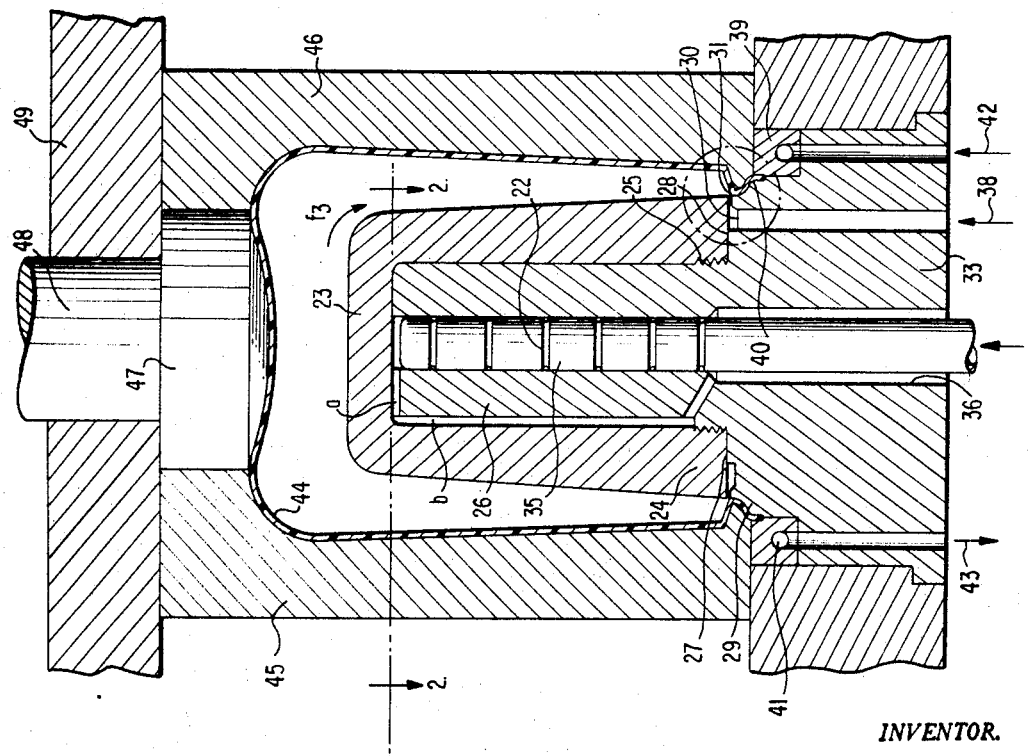
FIGURE 1 shows a longitudinal cross-section of the preform core in accordance with the present invention within a blowing chamber.

FIGURE 1 shows a core in accordance with the present invention within a blowing mold. A hood 23 is screwed at the lower neck portion thereof 24 onto a threaded shoulder 25 provided at the base of a shaft 26. At its most downward position, hood 23 rests on face 27, while its lower edge 28 remains at a certain predetermined distance, referred to in detail below, from an underslung annular crown 29 circumscribing the bearing crown 27.

A toric channel 30 forms a decompression chamber or an annular collector which feeds the slot 31 which remains open at the base of the hood 23. Channel 30 is fed by a channel 38 running through collar 33 of the shaft 26.

The oil used for regulating the temperature is admitted through oil intake or supply pipe 35, having channels 22 which prevent the backflow of oil. The oil spreads out in a uniform manner therefrom from the top of the shaft 26 toward the base thereof under hood 23. The oil is removed by means of radial piping 36.

Figure 2:
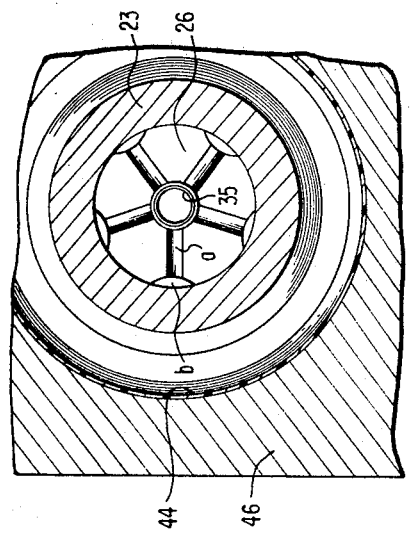
FIGURE 2 is a transverse section taken along the line 2—2 of FIGURE 1.

The transverse section view in FIGURE 2 shows more clearly the conduits *a* and grooves *b* which are used for removing the oil from the core.

Returning to FIGURE 1, an annular ring 39, preferably isolated from the remainder of the core by mica or grooves whereby a throat 40 between the same and crown 29, is traversed by circulating cooling water in an annular pipe 41. This water enters at 42 and returns at 43.

To achieve perfectly distinct oil and blowing air circuits, a joint, not shown, may be provided between the region of the inner edge of the hood 23 and the shaft 26 or the annular face 27.

Thus, the core block shown in FIGURE 1 essentially comprises:

(1) A face plate whose temperature is perfectly controlled, since the oil circulates just under the surface of hood 23. In addition, the summit or top of the hood, being highly heated since it repeatedly receives, during the injection step, the injected plastic before it has begun to cool, is directly exposed to the oil admitted through piping 35.

(2) A throat 40 situated at the base of the hood 23 and so cooled that the edge of the preform, injected into this throat to form the neck of the blown article or receptacle, is firmly held in place outside the injection chamber during the disengagement of the preform and during its conveyance to the blowing mold.

(3) A collar 33 which insures the interchangeable positioning of the core and (4) A slot 31 situated at the base of hood 23, being very closely positioned with respect to what becomes the neck of the blown object.

It is this slot 31 which distributes the blowing air evenly all around the core and regulates the flow thereof since it forms a throttling of small cross-section at the end of the feed piping. In this way, the same conditions of expulsion of blowing air, whatever the small variations in blowing pressure may be, are assured of being reproduced. Similarly, when the blowing air feed pipes simultaneously feed a series of cores, there need be no fear of a sudden decompression in the apparatus if one of the preforms bursts during its expansion.

Moreover, since slot 31 is permanently open, the air in channel 30 may escape freely and will not hinder the penetration of the injected plastic. In fact, this air may even be suctioned over the hood 23 by means of slot 31.

When the injected preform is blown on hood 23 and the preform has taken the shape shown at 44 in the two blowing half-mold shells 45 and 46, a hyperpressure remains on the inside of the mold. Since slot 31 remains open in spite of this hyperpressure, it is very easy to release it by putting the piping 38 in communication with the atmosphere. Thus, as a result, the core block may be removed from the blown object without this internal hyperpressure producing a fissure or rupture of the edge of the article as a result of vibrations set up by a sudden escape of air around the edge of the article within throat 40.

Therefore, it can be readily seen from FIGURE 1 that the classical valve employed in the prior art has been replaced in accordance with the present invention by a so-called "static" valve, i.e., one containing no moving parts.

Figure 3:
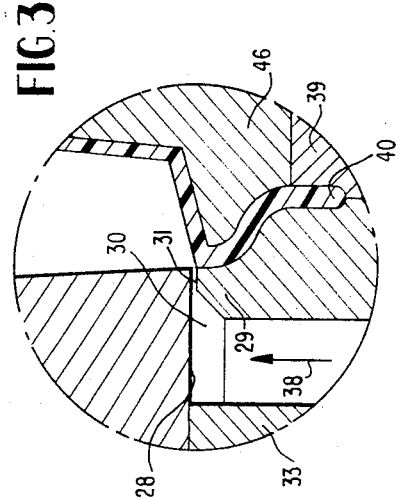
FIGURE 3 is an enlarged sectional view of the slot at the base of the core.

FIGURE 3 shows an enlarged view of said slot 31 together with its closely associated structure. The reference numerals thereon are the same as described in FIGURE 1.

During injection, the thermoplastic material must be prevented from entering slot 31. It has been determined that this can be achieved if this slot, or more generally, the orifice or orifices of blowing, has a width or gap lower than a certain critical value, called the "critical penetration threshold" of the plastic material.

It is obvious that this threshold value, as well as the number of orifices, is related to the injection pressure, the viscosity of the thermoplastic material, the volume of the object to be blown and the temperature of the thermoplastic material at the time that it reaches the orifice during injection. In particular, where the thermoplastic reaching the orifice is but slightly fluid, for example, when a polyethylene preform is injected onto a relatively cold core, the limit of the critical penetration threshold value can be appreciably increased up to the tolerances usually allowed for the molding of joint planes.

In practice, it has been determined that when polystyrene is injected at a temperature of about 120° C. and under a pressure of 7,110 lbs. per sq. inch (500 kg./cm.$^2$), the threshold value is about 25 microns.

It may be observed from FIGURE 1 that the bottom of the blowing mold is partially constituted by the rounded surface of a cylindrical piston 47 housed between the two half-mold shells 45 and 46 which is adapted to slide by means of its stem 48, which latter moves in a plate 49.

When the hood 23, covered with the thermoplastic preform, is introduced into the blowing mold, as shown in FIGURE 1, and when, because of the rate of output, the softened condition of the plastic is not perfect, it is seen that the semi-fluid summit of the preform tends to move in the direction of arrow $f_3$. However, since the preform is already extremely thin, it is retained by the cooled base of annular ring 39. Consequently, the superficial internal or thermal tensions tend to bring about localized thinning of the preform and to burst the preform in the region of its summit at the top of the core. This is why, on the one hand, steps are taken during injection to insure that on leaving the injection mold the preform has a certain thickness 50 (FIGURE 4A) in the region of its summit and, on the other hand, the head of the piston 47 is applied to the summit or top of the preform as soon as it is situated in the blowing mold sections 45 and 46. As a result of this latter contact, the preform cools instantaneously in situ, and a local hardening occurs in this region. When this happens there is no longer any fear of the preform bursting, and the piston 47 may be raised again and the lower surface thereof restores the continuity of the wall of the blowing chamber. When air is expelled by the slot 31, the excess thickness 50, more or less crushed by the piston, becomes an inherent part of the remainder of the expanded preform.

A trademark may be engraved on the piston 47, and it will not be deformed during the expansion of the preform, thus allowing a readily identifiable mark to be placed on the molded article or receptacle. Also, the use of certain marks in different blowing molds permits immediately the identification of a defective mold in the event of the production of defective articles.

The risks of puncture of the thermoplastic material at the top or summit of the preform may also be considerably reduced by having the plastification of the material be as complete and as homogeneous as possible. Thus, when the plastic consists of a mixture of particles which varies from the fluid to the barely pasty state, considerable difficulties are encountered. This is why it is preferred that, before injection, internal heat exchange within the mass of pasty thermoplastic material to be injected has been stabilized so as not to affect the rate of production of the desired articles. Hence, conventional injection chambers wherein the thermoplastic material is heated in the region of the walls are to be avoided, while either screw-type presses or presses where the trajectory and the speed of the thermoplastic material between the beginning of heating and the injection chamber enable any heat exchange to become stabilized and uniform may be readily employed in the present invention.

FIGURES 4A and 4B illustrate a cross-sectional view of a modification of the core shown in FIGURE 1. FIGURE 4A shows the core in an injection chamber, while FIGURE 4B shows the core in a blowing mold.

In this modification, piston 47 shown in FIGURE 1 is unnecessary because hood 23a bearing the preform itself crushes the summit of the preform against the bottom of the blowing mold 52. Thus, an engraving may therefore be made both on the bottom 52 of the blowing mold and on the summit 53 of the hood 23a.

It should also be observed that hood 23a is mounted in a different manner from that of hood 23 shown in FIGURE 1. In particular, hood 23a slides by means of longitudinal grooves 55 on shaft 26a.

The transverse view at line 5—5 of FIGURES 4A and 4B shown in FIGURES 5A and 5B shows more clearly these latter mentioned guiding means for the hood, which are essentially constituted by the cylindrical wall of the core at the level of the grooves 55. Aside from the function of the circulating oil in regulating the temperature of the core, it also serves to partly lubricate the sliding or gliding between the core and the shaft.

The extent of this sliding is very small and is limited by three gudgeon pins 56 screwed into the bottom of hood 23a, the heads 57 of which abut seatings provided on the back face of collar 33a of shaft 26a. Gudgeon 56, which limits the width of the slot, is shown in FIGURE 4A in a low position, i.e., with the slot closed. The slot 31a in FIGURE 4B is shown in the open position.

In order to avoid unnecessary repetition, similar elements in FIGURES 1 and 4A and 4B have the same numbers and are merely differentiated by the use of a. Thus, in FIGURES 4A and 4B, ducts 35a, 38a and 41a are analogous to the temperature regulatory fluid, the air and the cooling water ducts shown as 35, 38 and 41, respectively, on FIGURE 1.

Hood 23a slides on a smooth bearing provided at the base of shaft 26a, and a joint 59 insures substantially complete air-tightness between duct 36a and slot 31a, which slot is opened when the hood is freely dawn toward the top of the structure by a spring 60. As can be seen from FIGURES 4A and 4B, spring 60 is situated at the upper part of the shaft 26a. The circulation of a temperature regulating fluid such as oil in the vicinity of this spring is maintained.

It will be observed that the core in FIGURES 4A and 4B contains a slot 31a which does not have a fixed opening as in the case of slot 31 shown in FIGURE 1. However, slot 31a is permanently opened by spring 60, except when axial pressure $F_4$ of great intensity is applied to the hood 23a.

The latter embodiment of the present invention has certain distinct advantages in certain cases and when, for reasons of production rate or because of some particular operation of the apparatus, it may be necessary to increase the injection temperature or to use a more fluid material or to increase the blowing temperature. These characteristics have an influence on the "critical penetration threshold," and it may happen that a slot having a fixed gap distance, as shown in FIGURE 1, under certain of these conditions may be too large. Thus, the thermoplastic material would infiltrate the slot, cool within it and thereby obstruct it more or less, in spite of the blowing air which tends to unblock the slot thereof. This results in an uneven and dissymmetrical distribution of the blowing air and, consequently, an uneven expansion of the preform, zones of weakness and even blisters, punctures or folds in the objects obtained. These results could only be taken care of in the past by dismantling the core and cleaning the slot which, of course, is time-consuming and expensive.

However, in accordance with the embodiment shown in FIGURES 4A and 4B, the slot 31a is normally retained opened by the powerful spring 60 exerting a permanent counterpressure. However, when the pasty thermoplastic material injected under high pressure at 63 penetrates into the injection chamber, the spring is compressed under an enormous pressure $F_4$, and the slot 31a closes, thereby preventing any infiltration of thermoplastic material into the blowing slot.

Since, on the one hand, the pressure of the thermoplastic material increases evenly between the beginning and the end of injection and since, on the other hand, the relationship governing this increase is in a very complicated relationship with respect to the characteristics of the cooling network, the specific heat of the material, the shape of the preform, etc., it is very difficult to indicate at what precise moment the slot will close or, even, whether it will close. The essential point is that at the time the plastic material reaches the slot, the spring is sufficiently compressed so that the opening of the slot 31a is less or equal to the "crital threshold" for which the particular thermoplastic material, considering its pressure and its viscosity, would tend to penetrate therein.

It is therefore sufficient that, when the slot 31a is completely open, its gap—as a safety measure—should correspond to the maximum "critical threshold" determined under the most unfavorable conditions of penetration, and that the spring 60 should give way under the injection pressure thereof.

Spring 60 should also be able to resist the closing of the slot when the thermoplastic material at 51 is crushed between the bottom 52 of the mold and the extremity 53 of the core, at the time when the latter is inserted into the blowing mold.

In certain circumstances, spring 60 may be situated at the base of the assembly although this variation is not as satisfactory as the embodiment shown in FIGURES 4A and 4B because of the possibility of the hood being moved or pushed laterally, thereby giving rise to dissymmetric expansion of the preform. Thus, an arrangement wherein a slot having a fixed gap distance, as in FIGURE 1, or wherein movable parts which have but very little play and exert considerable tension, as shown in FIGURES 4A and 4B, is preferred in order to allow permanent centering of the core and complete irrigation of its mass at one and the same time.

The cores illustrated herein are in the shape of long mandrels, but it is possible to use very short or even very flat mandrels, the shape thereof limited only with respect to the desired shape of the blown objects. The static valve, i.e., the slots having a fixed width or gap, could, in this case, be provided in the form of one or several slots between the opposite cylindrical surfaces of concentric crowns.

Finally, it should be noted that the slot 31a and the edge 68 (FIGURE 4B) of the blowing mold are so positioned that the plastic film tends to lie exactly in the direction of the blowing gas, thereby conferring upon the neck of the finished article a shape including a 90° angle. In this way, the neck of the finished article has exceptional rigidity, and there need be no fear that it will break away from its stopper after capsuling. Similarly, this edge 68 makes it possible to retain the blown thermoplastic material 44a firmly during disengagement of the core block 33a. In particular, in the case of yogurt containers, there is no danger that the neck of the containers, more or less squeezed among the various packages in a shopping basket, will become opened within the basket. The affixing of capsules or tops on the injected and perfectly shaped neck may also be improved by corrugation or by small stops provided under the neck.

Thus, in accordance with the present invention, cores having blowing orifices which are normally open and through which the air may pass in both directions, which is not the case with cores where the orifices are fitted with classical flap-valves, has allowed the elimination of the difficulties heretofore encountered in blowing pre-injected cooled and stored preforms which are reheated on a core before being blown therefrom.

Figure 6:
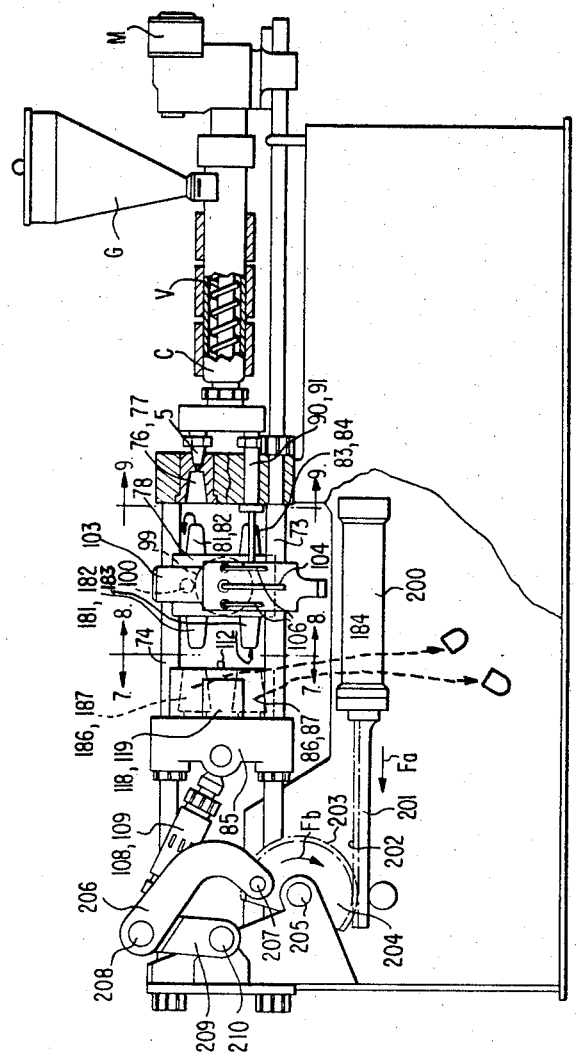
FIGURE 6 is a side elevation of a blowing and injection apparatus in accordance with the present invention.

FIGURE 6 illustrates an apparatus for manufacturing articles of thermoplastic material by expansion molding utilizing the preform cores of the present invention. At the right of FIGURE 6 is a screw-type feeding machine which feeds plastic material into nozzle 5. This machine constitutes endless screw $v$ with its motor drive M as well as the plastification or softening chamber C and thermoplastic powder feed gullet G.

Jacks 90 and 91 operate block 78 which supports the preform cores. Block 78 glides on columns 73 and 74. Elements 76 and 77 represent the injection chambers, while elements 86 and 87 are the blowing molds. Block 85, which supports the blowing molds, is driven by knuckle joints 108 and 109. The knuckle joints are driven by means of jack 200 whose piston axis 201 is provided with teeth 202. These teeth 202 cooperate with teeth 203 of a sector 204 which pivots around an axis 205, the latter being integral with the frame.

A rod 206 is connected, on the one hand, to sector 204 by means of axle 207 and, on the other hand, to the knuckle joints 108–109 by means of axle 208. Another rod 209 is connected, on the one hand, to the frame by means of axle 210 and, on the other hand, to the end of the knuckle joints by means of axle 208.

When jack 200 acts in the direction of the arrow Fa, the sector pivots in the direction Fb. The axle 207 is then displaced downwardly and forces the rod 209 to be placed in the position next to the horizontal in conjunction with the intermediary action of rod 206. Under this condition, the knuckle joint 108 forces the block 85 to be displaced toward the right of the apparatus shown in FIGURE 6 at the moment of the blowing phase of the process.

In the central block 78, which is adapted to pivot by means of motor 103 together with the intermediary action of pinions 99 and 100, there are disposed the inlet pipes for the temperature regulating fluid, for example, oil, at 104 and for the cooling water at 106.

FIGURE 7 is a transverse sectional view showing the device used for closing the molds. This means constitutes the two jacks 118 and 119. The jack 118 is integral, on the one hand, with the half-mold 117 and, on the other hand, with the half-mold 115. The two half-molds 115 and 117 are connected by means of connecting rods 211 and 212. The jack 119 is connected, on the one hand, to the half-mold 114 and, on the other hand, to the half-mold 116. These two half-molds 114 and 116 are connected to each other by means of connecting rods 213 and 214. When the molds are closed, the half-molds 115 and 117 are displaced as a single block toward the right, while the half-molds 114 and 116 are displaced as a single block toward the left.

Element 112 designates the supply inlet of the fluid used for the blowing operation. Columns 73 and 74 are the support columns for the machine.

FIGURE 8 illustrates a transverse sectional view of FIGURE 6 taken at the line 8—8. The central block 78 contains four cores, 81, 82, 83 and 84. Pinion 99 is geared with pinion 100 mounted on shaft 101, the rotation of which is effected by jack 103. The inlet pipes for, for example, the circulating oil and the cooling water, are shown as elements 104 and 106, respectively. The uniform supply of compressed air for the blowing step is effected by means of orifice 113.

FIGURE 9 illustrates a sectional view of the preforming molds (injection chambers), such as 76 and 77. Jacks 90 and 91 operate the block 78 which supports the cores which are inserted thereinto.

FIGURE 10 is an enlargement of one of the cores 81 contained in the apparatus of FIGURE 6, this core being constructed in accordance with the present invention, such as illustrated in FIGURES 1 and 4A and 4B.

It should be clear from a consideration of the drawings that when a film of injected thermoplastic material is disposed on the cores, for example, 81 and 82, the cores 181 and 182 come to cooperate with molds 186 and 187. The jack 103 is then actuated to control the rotation of the element 78, and the knuckle joints 108 and 109 cause element 85 to slide, which actuates the element 78 to move to the right such that cores 181–184 become positioned within molds 186–187 and 86–87, respectively. During this movement, the passageway 112 adapts itself to the orifice 113 to permit the delivery of air to the cores for the blowing step. At the same time, cores such as 81–82 have been positioned within the injection chambers such as elements 76 and 77. Thus, the injection orifices become positioned properly with respect to the injection nozzles.

The machine is then ready for a new injection on the cores such as 81 and 82 and a new expansion from the preform blanks disposed on cores such as 181 and 182. The temperature of the thermoplastic blanks is then stabilized in accordance with the present invention. Then, the knuckle joints 108 and 109 are employed to withdraw element 85 until it is returned to the position shown in FIGURE 6. Jacks 118 and 119 control the opening of the molds such as 86 and 87 to permit the removal of the expanded articles. Jacks 90 and 91 control the movement of block 78.

I claim:

1. A method of forming hollow articles of thermoplastic material comprising the steps of injecting said thermoplastic material onto at least one preform core contained in an injection chamber, simultaneously blowing a thermoplastic preform contained on at least one second preform core in a blowing mold by means of a fluid under pressure, the base of said second preform core being disposed opposed to the base of said first preform core, the bases of both cores being disposed on a common plate, simultaneously withdrawing, by translational motion, the injection mold and the blow mold containing the finished article from the first and second preform cores, said blow mold also simultaneously separating to permit the finished article to fall from the mold, rotating the plate containing said preform cores about an axis normal to the translational motion and inserting, by translational motion, said first core into the blowing mold and said second core into the injection mold.

2. The method of claim 1, wherein said steps are repeated in sequence so as to obtain a continuous production of said hollow articles.

3. The method of claim 1, wherein said plate is rotated through 180°.

4. The method of claim 1, wherein during blowing of said thermoplastic preform, said fluid under pressure is admitted to said core through an annular slot at the bottom of said core, and wherein during the injecting of said thermoplastic material onto said preform core, a vacuum is pulled through said slot.

5. A method of forming hollow articles of thermoplastic material comprising the steps of injecting said thermoplastic material onto at least one preform core contained in an injection chamber, simultaneously blowing a thermoplastic preform contained on at least one second preform core in a blowing mold by means of a fluid under pressure, said core having a temperature suitable for blowing by circulating a heat exchange fluid uniformly beneath the surface of said core, the base of said second preform core being disposed opposed to the base of said first preform core, the bases of both cores being disposed on a common plate, simultaneously withdrawing by translational motion the injection mold and the blowing mold containing the finished article from the first and second preform cores, said blowing mold also simultaneously separating to permit the finished article to fall from the mold, rotating the plate containing said preform cores about an axis normal to the translational motion and inserting, by translational motion, said first core into the blowing mold and said second core into the injection mold, the temperature of the core being controlled during said rotating and inserting steps by circulating the heat exchange fluid uniformly beneath the surface of the core.

6. The method of claim 5, wherein said steps are repeated in sequence so as to obtain a continuous production of said hollow articles.

7. The method of claim 6, wherein said plate is rotated through 180°.

8. The method of claim 5, wherein the preform core is placed and maintained in a predetermined relationship with respect to the walls of the injection chamber.

9. The method of claim 5, wherein during blowing of said thermoplastic preform, said fluid under pressure is admitted to said core through an annular slot at the bottom of said core, and wherein during the injecting of said thermoplastic material onto said preform core, a vacuum is pulled through said slot.

10. The method of claim 5, wherein the fluid under pressure is introduced into the blow mold against the lip of the article being formed.

11. The method of claim 5, wherein said thermoplastic preform is brought into contact with a cold piece positioned within said blowing mold opposite the top point of said preform before said top point of said preform bursts.

12. The method of claim 5, wherein a uniform temperature is maintained during transfer of the core from the injection phase to the blow mold by circulating a heat exchange fluid uniformly beneath the surface of said core.

References Cited

UNITED STATES PATENTS

| | | | |
|---|---|---|---|
| 2,688,159 | 9/1954 | Swartz | 18—45 |
| 2,792,593 | 5/1957 | Hardgrove | 18—5 |
| 2,353,825 | 7/1944 | Hofman | 18—5 |
| 2,853,736 | 9/1958 | Gussoni | 18—5 |
| 3,162,706 | 12/1964 | Cheney | 264—97 |
| 2,936,489 | 5/1960 | Sherman | 264—97 |
| 2,331,702 | 10/1943 | Kopitke | 264—97 |

FOREIGN PATENTS

| | | |
|---|---|---|
| 165,061 | 12/1953 | Australia. |
| 1,192,475 | 3/1959 | France. |

ROBERT F. WHITE, *Primary Examiner.*

A. R. NOE, *Assistant Examiner.*